(12) United States Patent
Dhruvakumar

(10) Patent No.: US 10,992,740 B2
(45) Date of Patent: Apr. 27, 2021

(54) DYNAMICALLY BALANCING PARTITIONS WITHIN A DISTRIBUTED STREAMING STORAGE PLATFORM

(71) Applicant: salesforce.com, inc., San Francisco, CA (US)

(72) Inventor: Srinivas Dhruvakumar, Vancouver (CA)

(73) Assignee: salesforce.com, inc., San Francisco, CA (US)

(*) Notice: Subject to any disclaimer, the term of this patent is extended or adjusted under 35 U.S.C. 154(b) by 284 days.

(21) Appl. No.: 15/979,091

(22) Filed: May 14, 2018

(65) Prior Publication Data

US 2019/0349422 A1    Nov. 14, 2019

(51) Int. Cl.
H04L 29/08 (2006.01)

(52) U.S. Cl.
CPC ...... *H04L 67/1002* (2013.01); *H04L 67/1095* (2013.01); *H04L 67/1097* (2013.01); *H04L 67/2809* (2013.01); *H04L 67/02* (2013.01)

(58) Field of Classification Search
USPC ........................................................ 709/201
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |

(Continued)

*Primary Examiner* — Todd L Barker
(74) *Attorney, Agent, or Firm* — Dergosits & Noah LLP; Todd A. Noah

(57) ABSTRACT

Described is a system that improves the performance of brokers that store partitions of data within a distributed data streaming platform by performing an efficient data redistribution process. The system may obtain data (e.g. metadata) describing the distribution storage partitions amongst storage brokers and determine the current (or initial) distribution may negatively impact the performance of the platform. Accordingly, the system may perform an efficient redistribution by performing a particular sequence of partition reassignments amongst brokers.

20 Claims, 11 Drawing Sheets

(56) References Cited

U.S. PATENT DOCUMENTS

| | | |
|---|---|---|
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,930,312 B1 * | 1/2015 | Rath ................ G06F 16/278 707/634 |
| 9,774,401 B1 * | 9/2017 | Borrill ................ H04L 9/0852 |
| 9,852,173 B1 * | 12/2017 | Schuller ............ G06F 16/2358 |
| 10,324,953 B1 * | 6/2019 | Elliott, IV ............ H04L 49/00 |
| 10,402,385 B1 * | 9/2019 | Pierce ................ G06F 16/2365 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2012/0254175 A1 * | 10/2012 | Horowitz ............ G06F 16/278 707/737 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0095813 A1 * | 4/2014 | Shukla ................ G06F 3/0673 711/154 |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2015/0269239 A1 * | 9/2015 | Swift ................ G06F 16/27 707/610 |
| 2016/0055220 A1 * | 2/2016 | Joshi ................ G06F 16/248 707/722 |
| 2016/0321296 A1 * | 11/2016 | Kakivaya ............ G06F 16/275 |
| 2017/0085634 A1 * | 3/2017 | Guney ............ G06F 16/24554 |
| 2017/0322996 A1 * | 11/2017 | Horowitz ............ G06F 16/278 |
| 2017/0371567 A1 * | 12/2017 | Piduri ................ G06F 3/0665 |
| 2018/0091586 A1 * | 3/2018 | Auradkar ............ H04L 67/1095 |
| 2018/0332325 A1 * | 11/2018 | Kaitchuck ........... H04L 65/4084 |
| 2018/0332365 A1 * | 11/2018 | Kaitchuck ........... H04L 65/4069 |
| 2019/0104082 A1 * | 4/2019 | Efimov ................ H04L 67/1095 |
| 2019/0208011 A1 * | 7/2019 | Dutta ................ G06F 11/1464 |
| 2019/0215313 A1 * | 7/2019 | Doshi ................ G06F 11/2082 |

\* cited by examiner

US 10,992,740 B2

DYNAMICALLY BALANCING PARTITIONS WITHIN A DISTRIBUTED STREAMING STORAGE PLATFORM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document generally relates to a distributed data storage system, and more specifically to dynamically balancing data stored within the distributed storage system.

BACKGROUND

"Cloud computing" services provide shared resources, applications, and information to computers and other devices upon request. In cloud computing environments, services can be provided by one or more servers accessible over the Internet rather than installing software locally on in-house computer systems. As such, users having a variety of roles can interact with cloud computing services.

As service providers grow (in terms of numbers of customers and/or amount of customer data), scalability becomes an issue. Accordingly, various distributed storage platforms are available to address such scalability issues. For example, distributing streaming platforms are available that allow large amounts of data to be accessed across many servers as part of the distributed environment. However, such a configuration may suffer from performance issues when certain servers become overloaded. Moreover, traditional load-balancing techniques often require prohibitive amounts of server downtime to be implemented. Accordingly, there is a need to improve techniques to improve performance of servers within a distributed environment.

BRIEF DESCRIPTION OF THE DRAWINGS

The included drawings are for illustrative purposes and serve only to provide examples of possible structures and operations for the disclosed inventive systems, apparatus, methods and computer program products for providing run-time querying of multi-tenant non-relational database objects. These drawings in no way limit any changes in form and detail that may be made by one skilled in the art without departing from the spirit and scope of the disclosed implementations.

DETAILED DESCRIPTION

Figure 1:
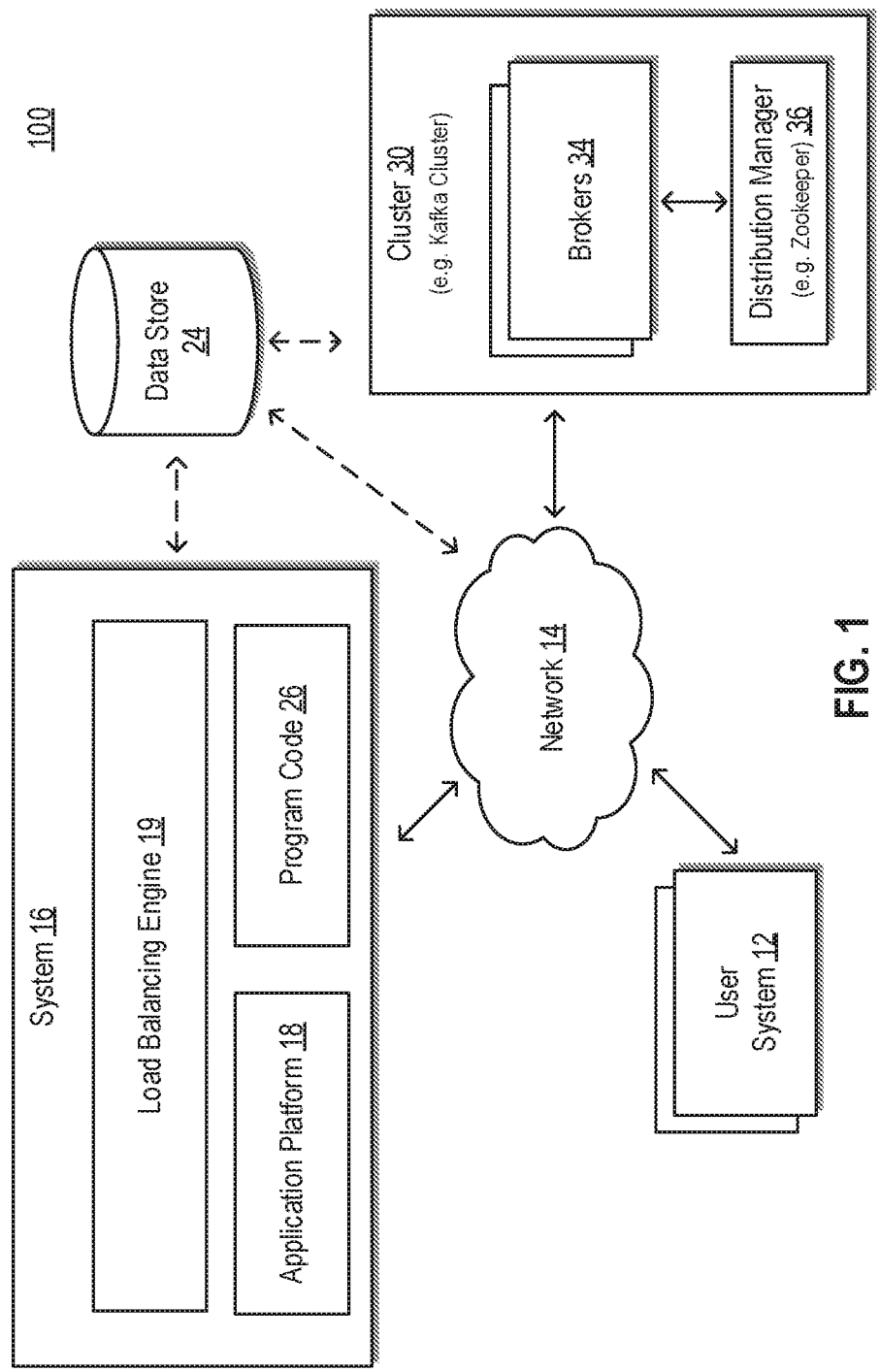
FIG. 1 shows a block diagram of an example of an operating environment 100 for balancing partitions according to one or more implementations of the disclosure.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated and may be performed in parallel. It should also be understood that the methods may include more or fewer operations than are indicated. In some implementations, operations described herein as separate operations may be combined. Conversely, what may be described herein as a single operation may be implemented in multiple operations.

Reference to "one implementation" or "an implementation" or "some implementations" means that a particular operation, feature, structure, or characteristic described in conjunction with the implementation can be included in at least one implementation. The appearances of the phrase "implementation" in various places in the specification do not necessarily all refer to the same implementation.

Some implementations of the disclosed systems (and apparatus, methods and computer program products) are configured to improve the performance of a distributed data storage platform. Described is a system that improves the performance of servers that store partitions of data within a distributed streaming platform by performing an efficient data redistribution process. In one implementation, the system obtains data (e.g. metadata) describing the distribution of partitions amongst servers (e.g. brokers) and determines whether the current (or initial) distribution may negatively impact the performance of the platform. For example, the system may determine that one or more brokers are overloaded thereby reducing the overall efficiency of the platform. Accordingly, the system may perform an efficient redistribution of partitions by performing a particular sequence of partition reassignments to create a redistribution mapping. In one implementation, the particular sequence of reassignments allows the redistribution of partitions to be performed in efficient manner without significantly impacting performance of the platform. Typically, a redistribution requires a certain amount of downtime to perform redistribution. However, the system implements a process to allow redistribution to occur by minimizing the required reassignments, and thus, reducing the amount of overhead required for such a redistribution.

In some implementations, the system may be implemented in conjunction with a Kafka® distributed streaming platform (e.g. developed by the Apache Software Foundation). In some implementations, the Kafka® platform provides the ability to publish and subscribe to streams of records (e.g. similar to a message queue or enterprise messaging system), store streams of records in a fault-tolerant durable way, and process streams of records as they occur.

A Kafka® implementation may include records, topics, partitions, brokers, clusters, logs, producers, and consumers. A topic may include a category or feed name to which records are published. In addition, topics may be multi-subscriber, and accordingly, a topic may have zero to many consumers that subscribe to its data. For each topic, a partitioned log may be maintained and each partition may be an ordered, immutable sequence of records that is continually appended to (e.g. a structured commit log). The records in the partitions may each be assigned a sequential ID number called the offset that uniquely identifies each record within the partition. Accordingly, the partitions allow the log to scale beyond a capacity of a single server (e.g. broker). For example, each individual partition may fit on the server(s) that host it, but a topic may have many partitions, and thus, may store an arbitrary amount of data. In addition, the partitions provide a unit of parallelism (e.g. replicas) as further described below. The partitions of the log may be distributed over the servers in the Kafka® cluster with each server handling data and requests for a share of the partitions. Moreover, each partition may be replicated across a configurable number of servers for fault tolerance. For example, each partition may have one server which acts as a leader and zero or more servers which act as followers (e.g. for replica partitions). The leader handles all read and write requests for the partition while the followers passively replicate the leader. If the leader fails, one of the followers may automatically become the new leader. Although, each server acts as a leader for some of its partitions and a follower for others, the loads of particular servers (e.g. brokers) may be overloaded, and hence, a redistribution of partitions may be required as further discussed below.

Kafka® implementations may include a ZooKeeper® service or system to manage the cluster. For example, ZooKeeper® may be used to coordinate the brokers/cluster topology. For example, Zookeeper® may perform leadership election of a broker. Zookeeper® may also manage service discovery for brokers that form the cluster. For example, Zookeeper® may send changes of the topology to Kafka®, so each node in the cluster knows when a new broker joined, a broker is down, a topic was removed or a topic was added, etc. Accordingly, Zookeeper® may provide an in-sync view of a Kafka® cluster configuration.

FIG. 1 shows a block diagram of an example of an operating environment 100 for balancing partitions according to one or more implementations of the disclosure. Environment 100 may include user systems 12, network 14, system 16, data store 24, and cluster 30. In one implementation, the system 16 may include an application platform 18, load balancing engine 19, and program code 26. In other implementations, environment 100 may not have all of these components and/or may have other components instead of, or in addition to, those listed above.

System 16 may be part of a database storage system. Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

In one implementation, the application platform 18 may include, or work in conjunction with, a distributed storage platform. In one implementation, the distributed storage platform may include a Kafka® distributed storage streaming platform. In addition, although not shown in this example, the application platform 18 may also reside on one or more servers (e.g. brokers) that are part of the distributed storage cluster 30.

Load balancing engine 19 may perform various processes including creating a redistribution mapping is further described herein. In some implementations, the load balancing engine 19 may interact with cluster 30, brokers 34, and/or configuration manager 36 is further described herein.

As described, in one implementation, the system 16 may interact with a cluster 30 (or storage cluster, or cluster of servers, cluster of brokers, etc.) as part of a distributed streaming platform. In one implementation, the distributed streaming platform may be implemented as a Kafka® platform. The cluster 30 may include one or more brokers 34 (e.g. servers) that store partitions organized within topics as described above. In addition, the cluster may interact with the distribution manager 36. For example, the distribution manager 36 (e.g. Zookeeper®) may manage (or assign) the distribution (e.g. topology) of partitions amongst the brokers 34.

Data store 24 may include any data (e.g. records, streams, objects, etc.) that may be accessed by system 16 and/or one or more brokers 34 of the cluster 30. For example, data store 24 may include data that is stored as part of the distributed streaming platform.

A user system(s) 12 may be implemented as any computing device(s) or other data processing apparatus such as a machine or system used by a user to access system 16. For example, any of user systems 12 can be a handheld and/or portable computing device such as a mobile phone, a smartphone, a laptop computer, or a tablet. Other examples of a user system include computing devices such as a work station and/or a network of computing devices. An on-demand database service, implemented using system 16 by way of example, is a service that is made available to users who do not need to necessarily be concerned with building and/or maintaining the database system. Instead, the database system may be available for their use when the users need the database system, i.e., on the demand of the users.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User system 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface between system 16 and network 14, but other techniques might be used as well or instead. In some implementations, the network interface between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Non-transitory computer-readable media as further described herein can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or any other type of computer-readable medium or device suitable for storing instructions and/or data. Additionally, the entire program code, or portions thereof, may be transmitted and downloaded from a source over a network connection.

In one implementation, the application platform 18 and/or load balancing engine 19 may be part of the program code 26.

As described above, the system may perform a redistribution process.

FIGS. 2A-2E show an example of performing a redistribution by performing a sequence of partition reassignments according to one or more implementations of the disclosure.

Figure 2A:
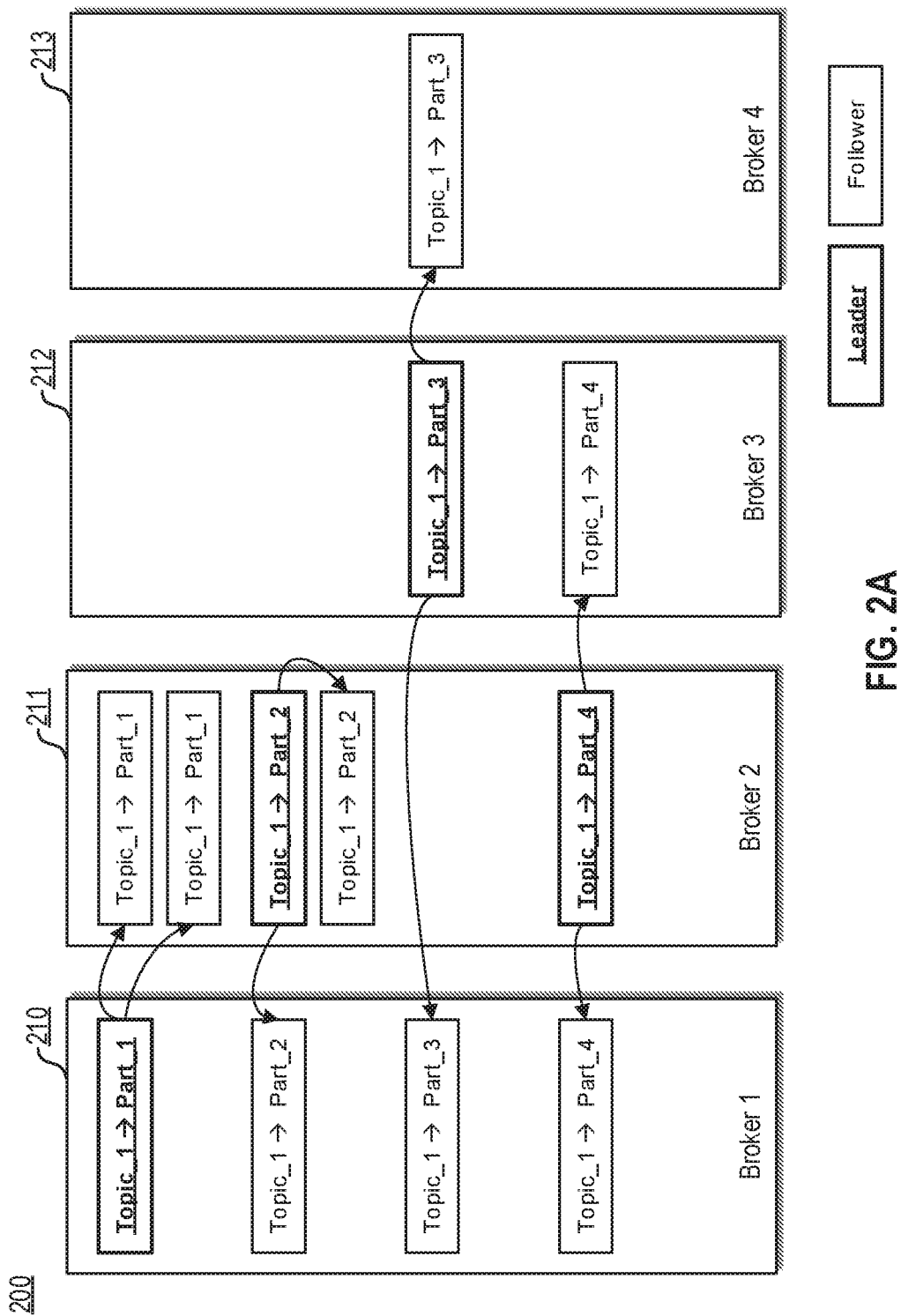
FIGS. 2A-2E show an example of performing a redistribution by performing a sequence of partition reassignments according to one or more implementations of the disclosure.

FIG. 2A shows an initial distribution of partitions amongst brokers. As shown, this example includes 4 brokers (broker 1 210, broker 2 211, broker 3 212, and broker 4 213) that store 4 partitions (Part_1, Part_2, Part_3, Part_4) for a particular topic (Topic_1). In addition, as shown, each partition has 2 replica partitions (e.g. 2 factor replication).

As described above, each partition includes 1 leader partition and 2 follower partitions (or replicas). Accordingly, there are a total of 12 partitions distributed amongst the 4 brokers, which may form a group.

In one implementation, the system may retrieve metadata to determine that the partitions (or a partition mapping) are distributed in a manner as shown, for example, in FIG. 2A. As described, the system may determine the initial distribution as shown may negatively impact the performance of a cluster of brokers (e.g. due to broker 1 and broker 2 being overloaded relative to the other brokers in the group). For example, a read and/or write may be negatively impacted based on an overloaded broker. In addition, the replication performance may also be affected based on an imbalance of partitions between brokers. Accordingly, the system may initiate performing a redistribution of the partitions amongst the brokers. In one implementation, the system may create a redistribution mapping. For example, the system may create a redistribution mapping by performing a sequential reassignment of partitions. In one implementation, this sequence may include performing a sequence of determinations (or steps) that each perform a redistribution.

Figure 2B:
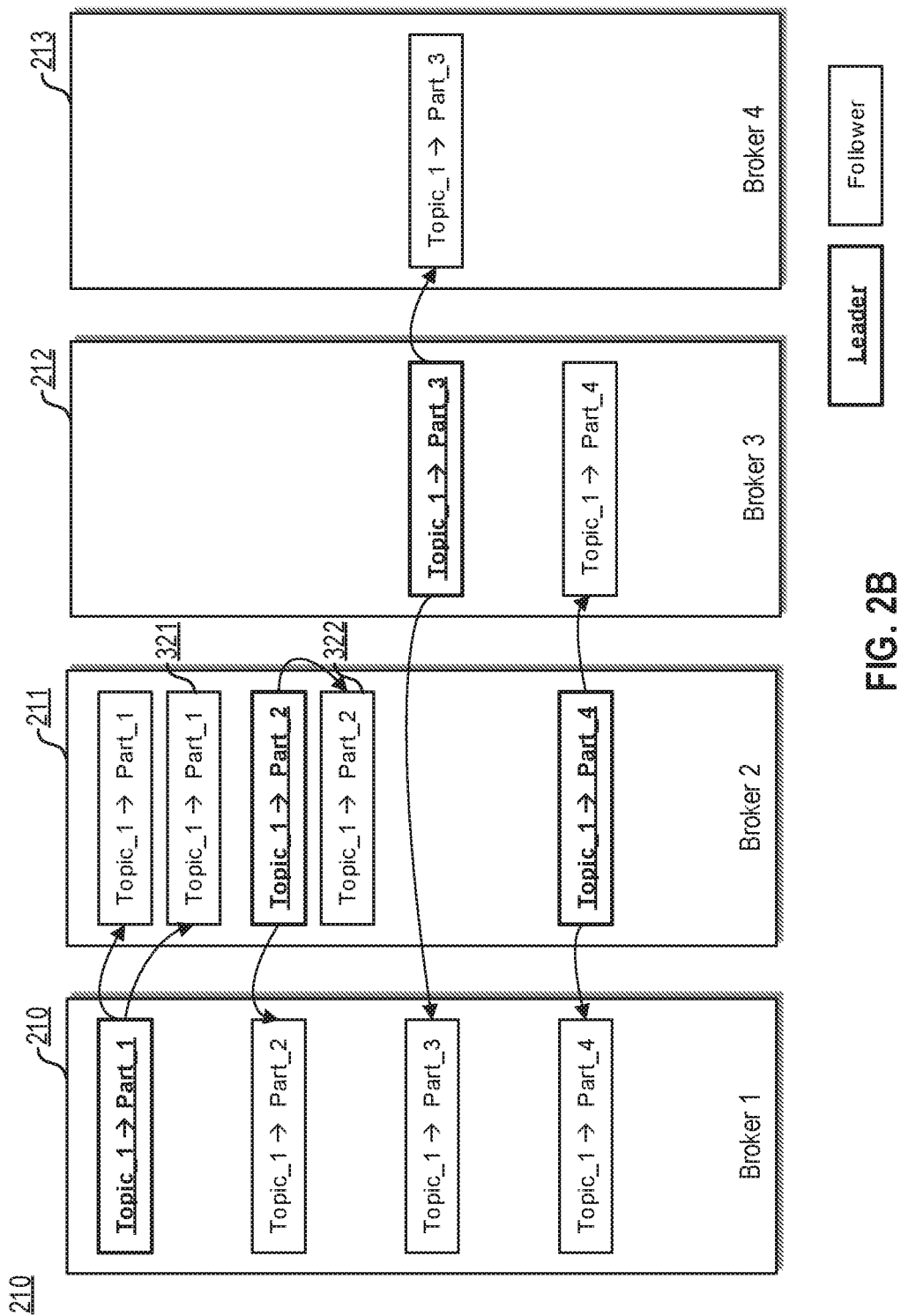
Figure 2C:
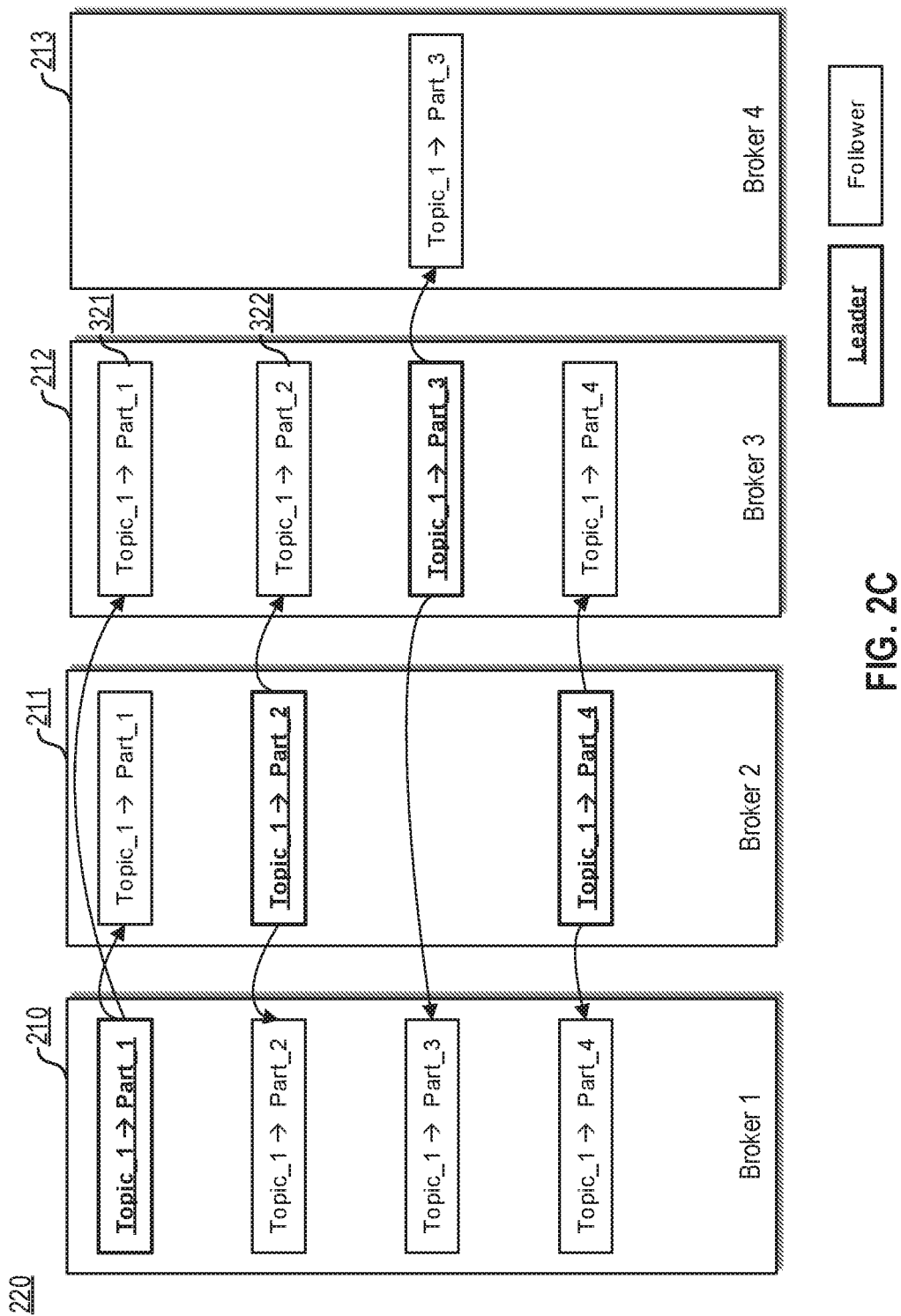

First (e.g. step a), the system may determine if two replica partitions of the same leader are stored on the same fault domain. For example, the fault domain may include a particular broker as is the case with this example, or may include a group of brokers, a cluster, or other configuration. As shown in FIG. 2B, the system may determine that partitions 321 and 322 are stored on the same broker (e.g. fault domain), which in this case is broker 2 211. Accordingly, in response to such a determination, the system may reassign partitions 321 and 322 to different brokers. As shown in FIG. 2C, partition 321 has been reassigned to broker 3 212, and partition 322 has also been reassigned to broker 3 212.

Figure 2D:
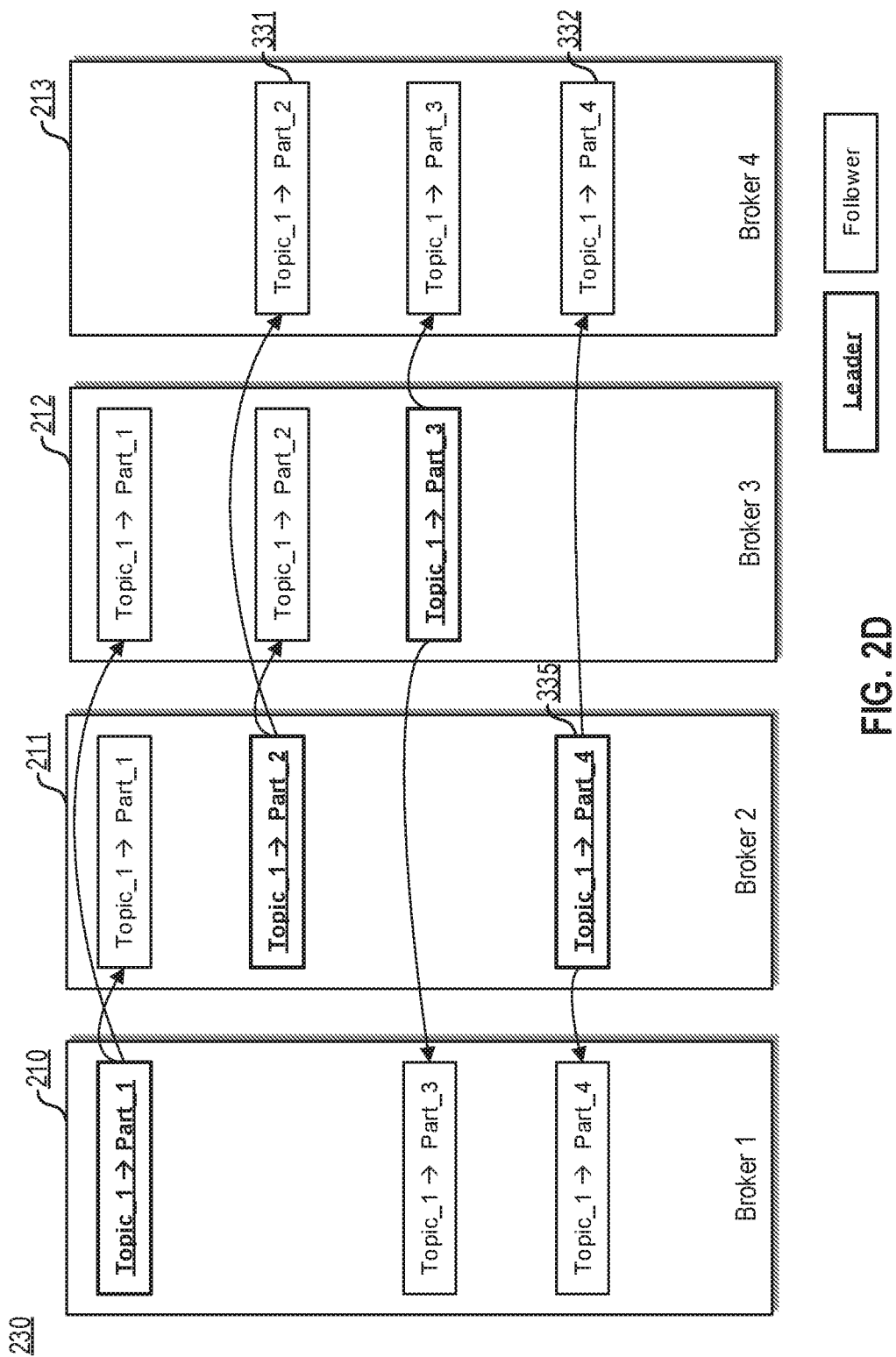

Next (e.g. step b), the system may determine whether there are an equal (or substantially equal) number of partitions of a particular topic distributed evenly amongst brokers. For example, as shown in FIG. 2C, broker 1 210 and broker 3 212 have more partitions than broker 2 211 and broker 3 213. Accordingly, in response to such a determination, the system may reassign partitions from broker 1 210 and broker 3 212, to broker 4 213. As shown in FIG. 2D, partitions 331 and 332 have been reassigned to broker 4 213.

Next (e.g. step c), the system may determine whether each broker has an equal (or substantially equal) number of total partitions. As shown in FIG. 2D, the system may determine that each broker has 3 partitions, and thus, does not need to perform a reassignment for this step of the process.

Figure 2E:
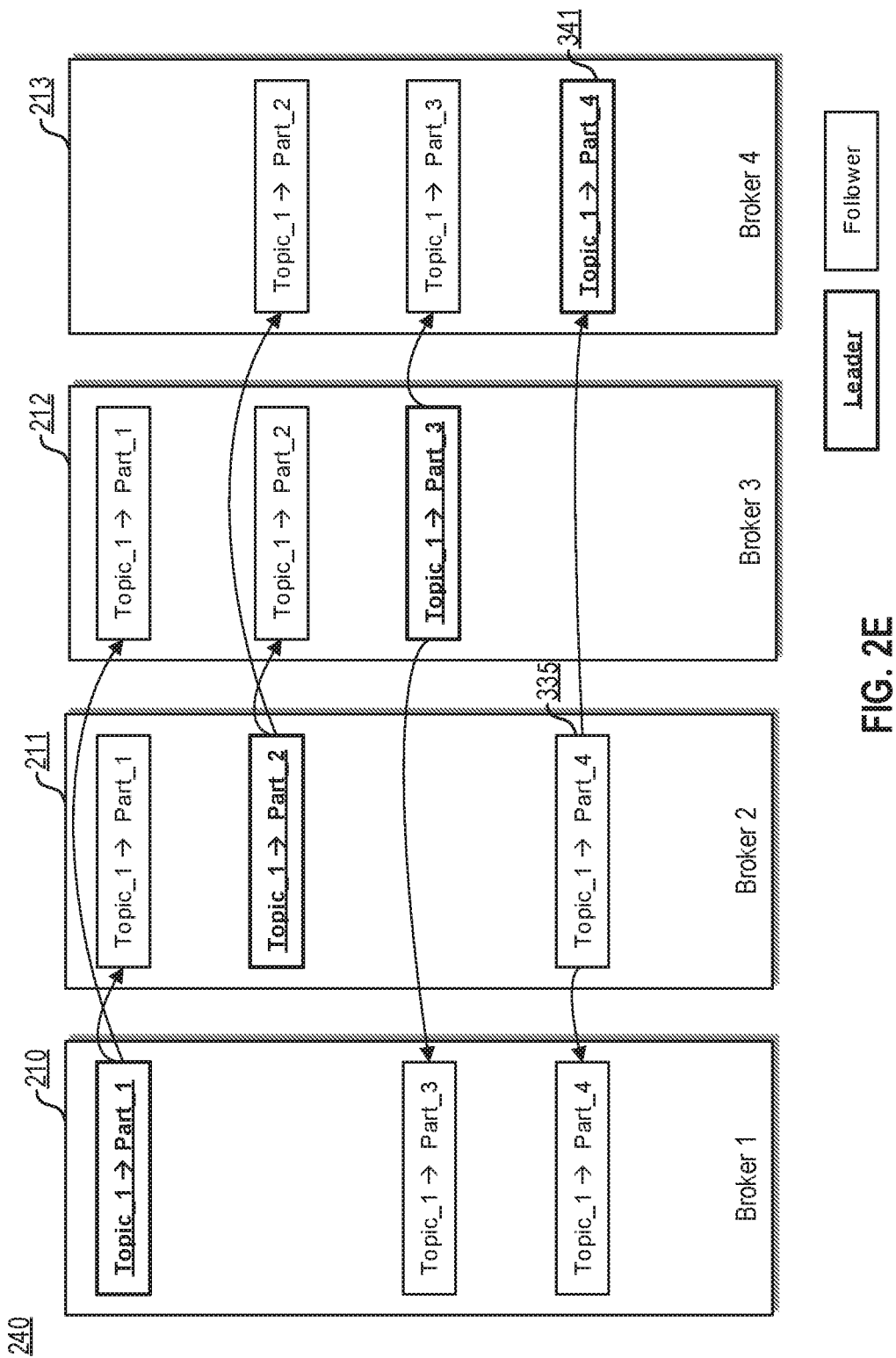

Next (e.g. step c), the system may determine whether each broker has an equal (or substantially equal) number of leader partitions. For example, as shown in FIG. 2D, broker 2 211 has 2 leader partitions, whereas brokers 1 210 and 3 212 have 1 leader partition each, and broker 4 has no leader partitions. Accordingly, in response to such a determination, the system may reassign partition 335 of broker 2 211. As shown in FIG. 2E, partition 341 of broker 4 213 has been reassigned as the leader partition for Part 4.

Accordingly, the system may create a mapping indicating the reassignment of partitions based on a comparison of the initial distribution (e.g. FIG. 2A) to the distribution upon completion of the redistribution process (e.g. FIG. 2E).

It should be noted that the example in FIGS. 2A-2E show a particular ordered sequence, but it is complicated that in other implementations the steps may be performed in a different order, or steps removed, or additional steps added.

Figure 3:
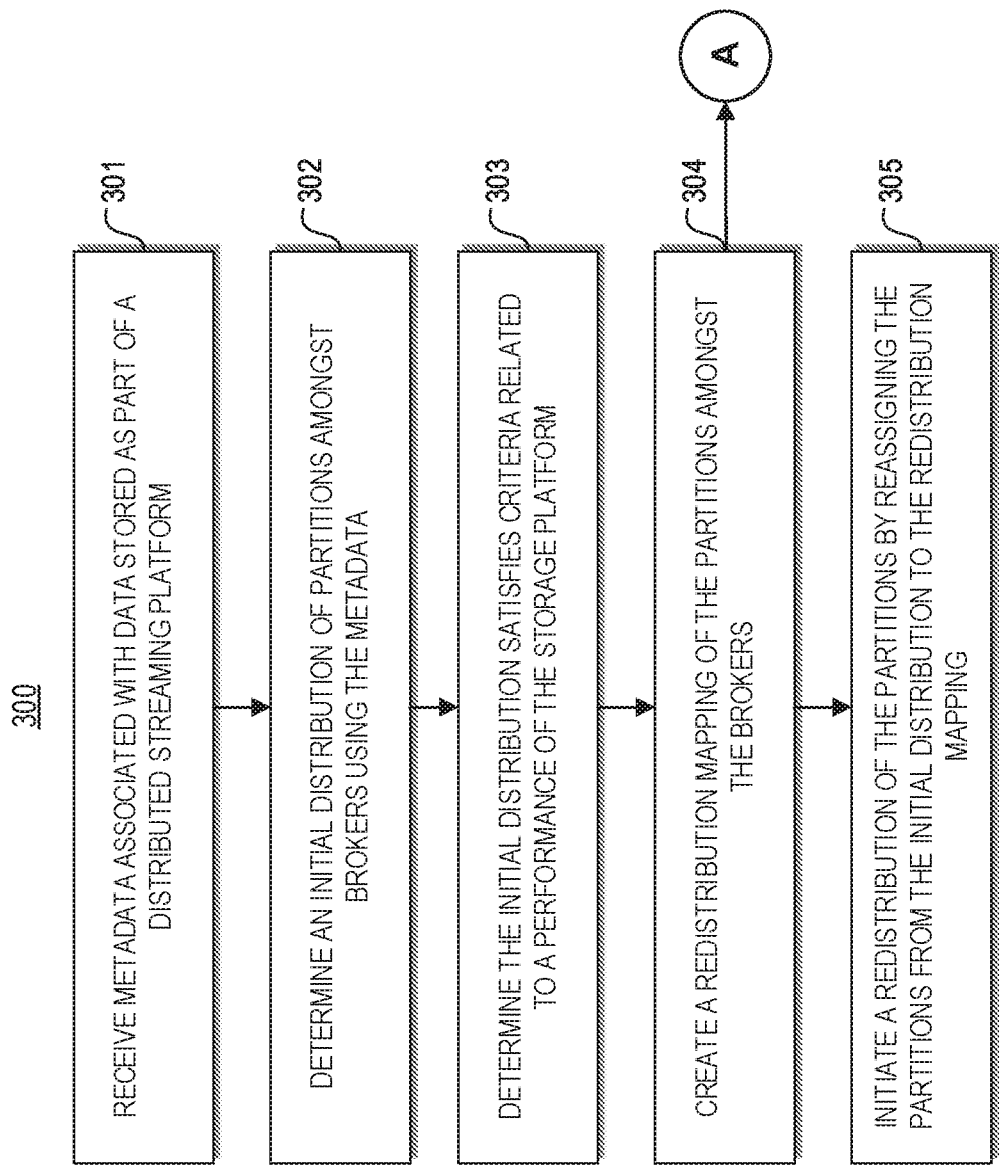
FIG. 3 shows a flowchart of an example of a method for forming a redistribution process of partitions according to one or more implementations of the disclosure.

FIG. 3 shows a flowchart of an example of a method for forming a redistribution process of partitions according to one or more implementations. Process 300 may use processing logic, which may include software, hardware, or a combination thereof. For example, process 300 may be performed by one or more components of environment 100 such as by a system (e.g. system 16, load balancing engine 19, etc.).

In 301, the system may receive metadata associated with data stored as part of a distributed storage platform. In one implementation, the metadata may be received from a service (or system) that is associated with the distribution of data amongst various broker (e.g. servers). For example, the metadata may be retrieved from a Zookeeper® system or service that may be implemented as part of a Kafka® platform. As described, the data may be stored within topics including partitions distributed amongst brokers, and the partitions may include leader partitions that are each associated with one or more replica partitions (e.g. followers).

In 302, the system may determine an initial distribution mapping of the partitions amongst the brokers from the metadata. For example, the system may analyze various information of the metadata to determine an initial (or current) distribution of partitions (e.g. as shown in FIG. 2A).

In 303, the system may determine the initial distribution mapping of the partitions satisfies one or more criteria related to affecting a performance of the distributed storage platform. For example, the criteria may include whether one or more brokers are overloaded with partitions that exceed a predetermined threshold.

In 304, the system may create a redistribution mapping of the partitions amongst the brokers. In one implementation, the system may create the redistribution mapping by performing an ordered reassignment sequence (e.g. as described above with respect to FIGS. 2A-2E). In one implementation, the system may create the redistribution mapping from the initial distribution mapping derived from the metadata.

In 305, the system may initiate a redistribution of the partitions amongst the brokers by reassigning the partitions from the initial distribution mapping to the created redistribution mapping. In one implementation, the system may use dispatching service that connects to the distribution manager (e.g. distribution manager 36). In one implementation, the system may connect or instruct the Zookeeper® service (e.g. in implementations using the Kafka® platform) to execute the redistribution mapping (or plan). In one implementation, the redistribution may be performed in batches.

Figure 4:
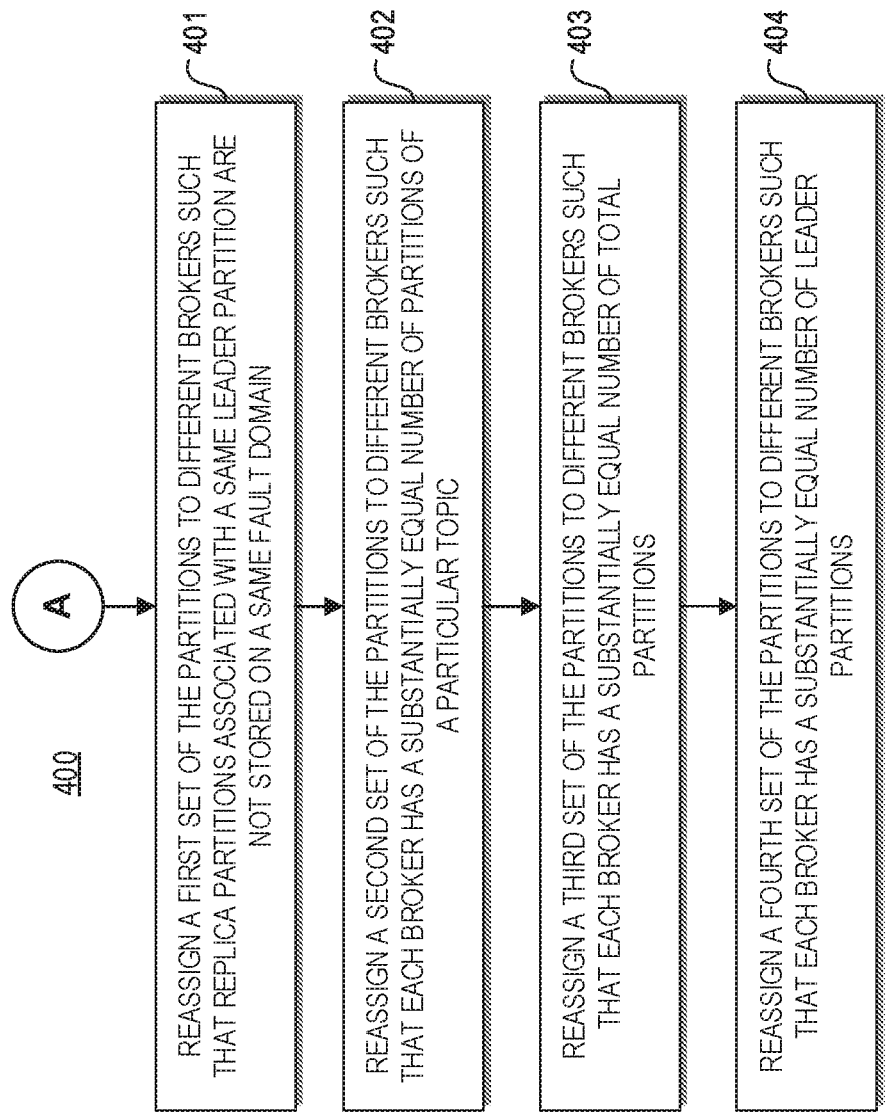
FIG. 4 shows a flowchart of an example of a method for creating a redistribution mapping according to one or more implementations of the disclosure.

FIG. 4 shows a flowchart of an example of a method for creating a redistribution mapping according to one or more implementations. Process 400 may use processing logic, which may include software, hardware, or a combination thereof. For example, process 400 may be performed by one or more components of environment 100 such as by a system (e.g. system 16, load balancing engine 19, etc.).

In 401, the system may reassign a first set of the partitions to different brokers such that replica partitions associated with a same leader partition are not stored on a same fault domain (e.g. step a as described above with reference to FIGS. 2A-2E).

In 402, the system may reassign a second set of the partitions to different brokers such that each broker has a substantially equal number of partitions of a particular topic (e.g. step b as described above with reference to FIGS. 2A-2E).

In 403, the system may reassign a third set of the partitions to different brokers such that each broker has a substantially equal number of total partitions (e.g. step c as described above with reference to FIGS. 2A-2E).

In 404, the system may reassign a fourth set of the partitions to different brokers such that each broker has a substantially equal number of leader partitions (e.g. step d as described above with reference to FIGS. 2A-2E).

Accordingly, as described above, in some implementations, the system may implement an efficient redistribution process for a distributed streaming platform.

Figure 5:
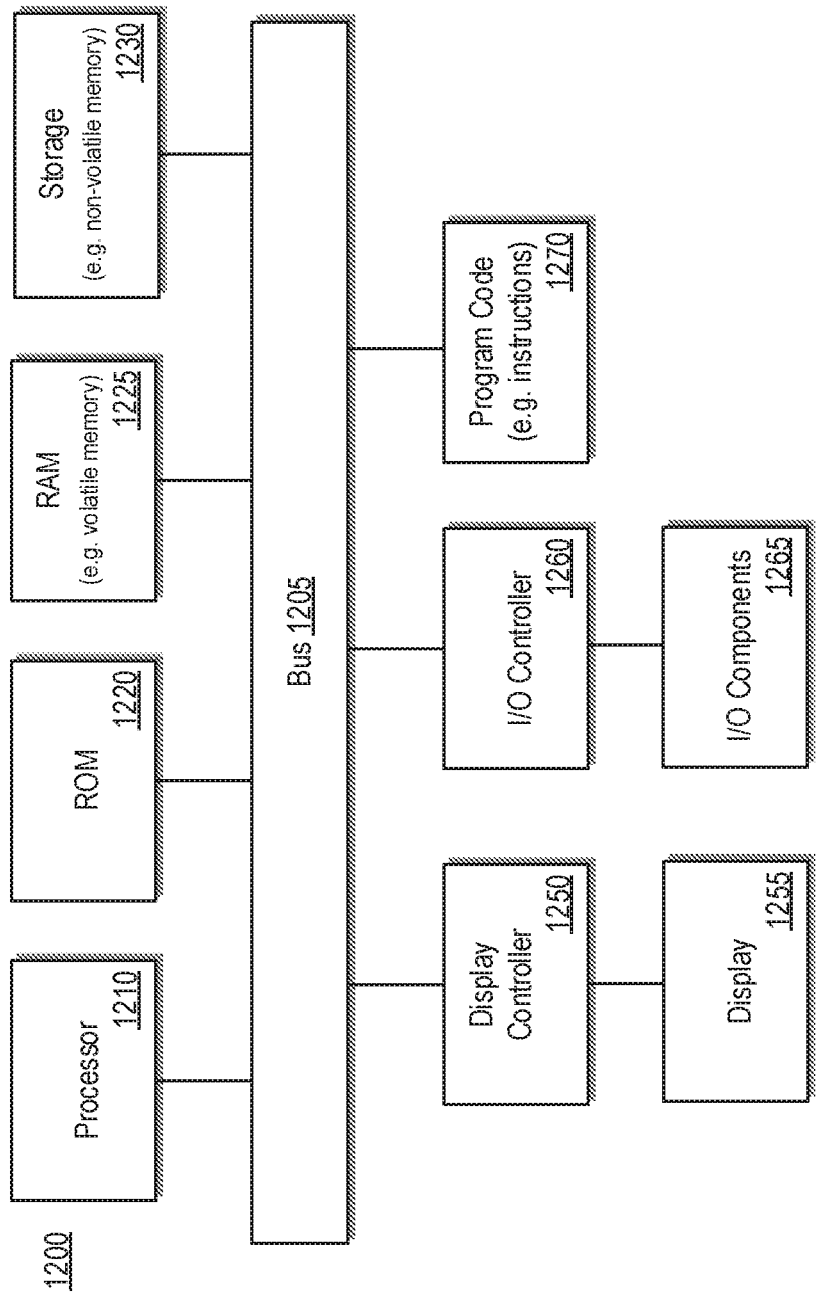
FIG. 5 shows a block diagram of an example computing system that may be used in conjunction with one or more implementations of the disclosure.

FIG. 5 shows a block diagram of an example computing system (or server) that may be used in conjunction with one or more implementations. For example, computing system 1200 (or system, or computing device, or device) may represent any of the devices or systems (e.g. system 16, load balancing engine 19, etc.) described herein that perform any of the processes, operations, or methods of the disclosure. Note that while the computing system illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 may include a bus 1205 which may be coupled to a processor 1210, ROM (Read Only Memory) 1220, RAM (or volatile memory) 1225, and storage (or non-volatile memory) 1230. The processor 1210 may retrieve stored instructions from one or more of the memories 1220, 1225, and 1230 and execute the instructions to perform processes, operations, or methods described herein. These memories represent examples of a non-transitory computer-readable medium (or machine-readable medium) or storage containing instructions which when executed by a computing system (or a processor), cause the computing system (or processor) to perform operations, processes, or methods described herein. The RAM 1225 may be implemented as, for example, dynamic RAM (DRAM), or other types of memory that require power continually in order to refresh or maintain the data in the memory. Storage 1230 may include, for example, magnetic, semiconductor, tape, optical, removable, non-removable, and other types of storage that maintain data even after power is removed from the system. It should be appreciated that storage 1230 may be remote from the system (e.g. accessible via a network).

A display controller 1250 may be coupled to the bus 1205 in order to receive display data to be displayed on a display device 1255, which can display any one of the user interface features or embodiments described herein and may be a local or a remote display device. The computing system 1200 may also include one or more input/output (I/O) components 1265 including mice, keyboards, touch screen, network interfaces, printers, speakers, and other devices. Typically, the input/output components 1265 are coupled to the system through an input/output controller 1260.

Program code 1270 (or modules, components, units, functions, engines, or logic) may represent any of the functions or engines described above (e.g. load balancing engine 19). Program code 1270 (e.g. program code 26) may reside, completely or at least partially, within the memories described above, or within a processor during execution thereof by the computing system. In addition, modules 1270 can be implemented as software, firmware, or functional circuitry within the computing system, or as combinations thereof.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

System Overview

Figure 6:
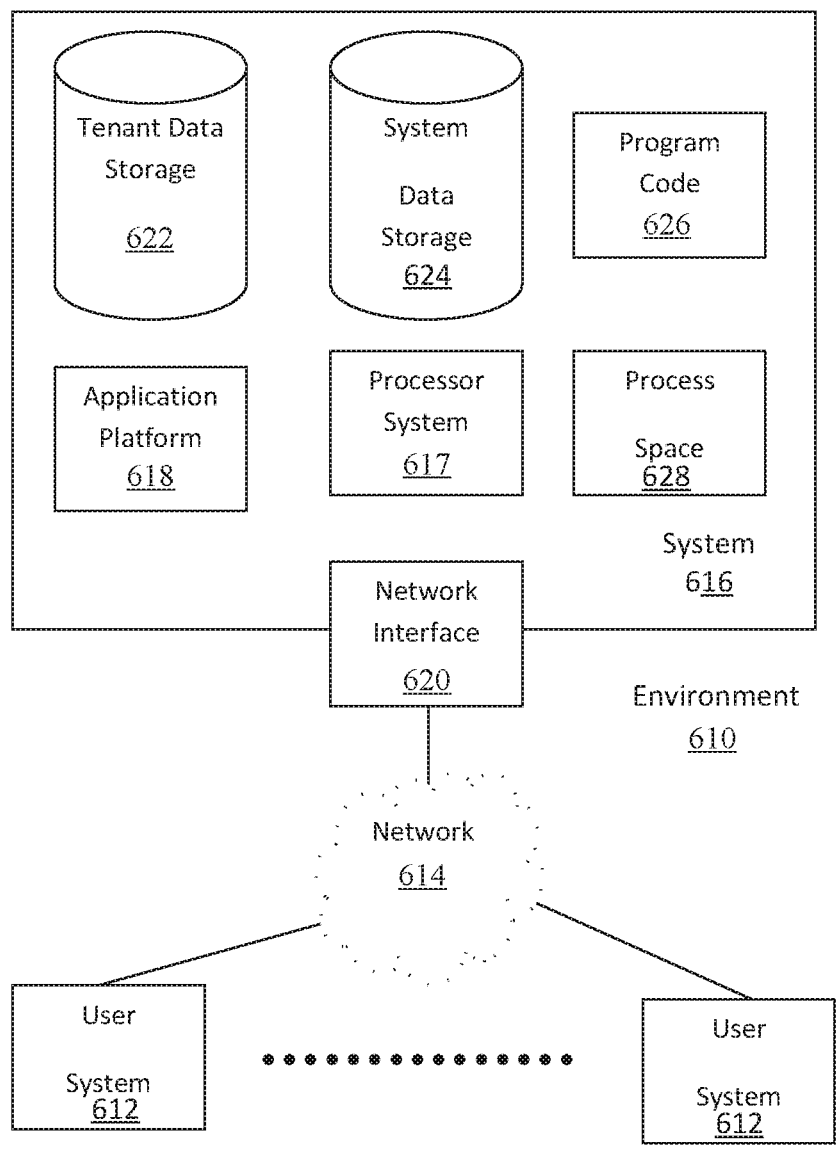
FIG. 6 illustrates a block diagram of an example of an environment wherein an on-demand database service might be used.

FIG. 6 illustrates a block diagram of an environment 610 wherein an on-demand database service might be used. The environment 610 may include user systems 612, a network 614, a system 616, a processor system 617, an application platform 618, a network interface 620, a tenant data storage 622, a system data storage 624, program code 626, and a process space 628. In other embodiments, the environment 610 may not have all of the components listed and/or may have other elements instead of, or in addition to, those listed above.

The environment 610 is an environment in which an on-demand database service exists. A user system 612 may be any machine or system that is used by a user to access a database user system. For example, any of the user systems 612 may be a handheld computing device, a mobile phone, a laptop computer, a work station, and/or a network of computing devices. As illustrated in FIG. 6 (and in more detail in FIG. 7) the user systems 612 might interact via the network 614 with an on-demand database service, which is the system 616.

An on-demand database service, such as the system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 616" and the "system 616" will be used interchangeably herein. A database image may include one or more database objects. A relational database management system (RDMS) or the equivalent may execute storage and retrieval of information against the database object(s). The application platform 618 may be a framework that allows the applications of the system 616 to run, such as the hardware and/or software, e.g., the operating system. In an embodiment, the on-demand database service 616 may include the application platform 618 which enables creation, managing and executing one or more applications developed by the provider of the on-demand database service, users accessing the on-demand database service via user systems 612, or third party application developers accessing the on-demand database service via the user systems 612.

The users of the user systems 612 may differ in their respective capacities, and the capacity of a particular user system 612 might be entirely determined by permissions (permission levels) for the current user. For example, where a salesperson is using a particular user system 612 to interact with the system 616, that user system 612 has the capacities allotted to that salesperson. However, while an administrator is using that user system 612 to interact with the system 616, that user system 612 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 614 is any network or combination of networks of devices that communicate with one another. For example, the network 614 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 612 might communicate with the system 616 using TCP/IP and, at a higher network level, use other common Internet protocols to communicate, such as HTTP, FTP, AFS, WAP, etc. In an example where HTTP is used, the user systems 612 might include an HTTP client commonly referred to as a "browser" for sending and receiving HTTP messages to and from an HTTP server at the system 616. Such an HTTP server might be implemented as the sole network interface between the system 616 and the network 614, but other techniques might be used as well or instead. In some implementations, the interface between the system 616 and the network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 616, shown in FIG. 6, implements a web-based customer relationship management (CRM) system. For example, in one embodiment, the system 616 includes application servers configured to implement and execute CRM software applications as well as provide related data, code, forms, webpages and other information to and from the user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 616 implements applications other than, or in addition to, a CRM application. For example, the system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of the system 616 is shown in FIG. 6, including the network interface 620, the application platform 618, the tenant data storage 622 for tenant data 623, the system data storage 624 for system data 625 accessible to the system 616 and possibly multiple tenants, the program code 626 for implementing various functions of the system 616, and the process space 628 for executing MTS system processes and tenant-specific processes, such as running applications as part of an application hosting service. Additional processes that may execute on the system 616 include database indexing processes.

Several elements in the system shown in FIG. 6 include conventional, well-known elements that are explained only briefly here. For example, each of the user systems 612 could include a desktop personal computer, workstation, laptop, PDA, cell phone, or any wireless access protocol (WAP) enabled device or any other computing device capable of interfacing directly or indirectly to the Internet or other network connection. Each of the user systems 612 typically runs an HTTP client, e.g., a browsing program, such as Microsoft's Internet Explorer® browser, Netscape's Navigator® browser, Opera's® browser, or a WAP-enabled browser in the case of a cell phone, PDA or other wireless device, or the like, allowing a user (e.g., subscriber of the multi-tenant database system) of the user systems 612 to access, process and view information, pages and applications available to it from the system 616 over the network 614. Each of the user systems 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 616 or other systems or servers. For example, the user interface device may be used to access data and applications hosted by the system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 612 and all of its components are operator configurable using applications, such as a browser, including computer code run using a central processing unit such as an Intel Pentium® processor or the like. Similarly, the system 616 (and additional instances of an MTS, where more than one is present) and all of their components might be operator configurable using application(s) including computer code to run using a central processing unit such as the processor system 617, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 616 is configured to provide webpages, forms, applications, data and media content to the user (client) systems 612 to support the access by the user systems 612 as tenants of the system 616. As such, the system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 7:
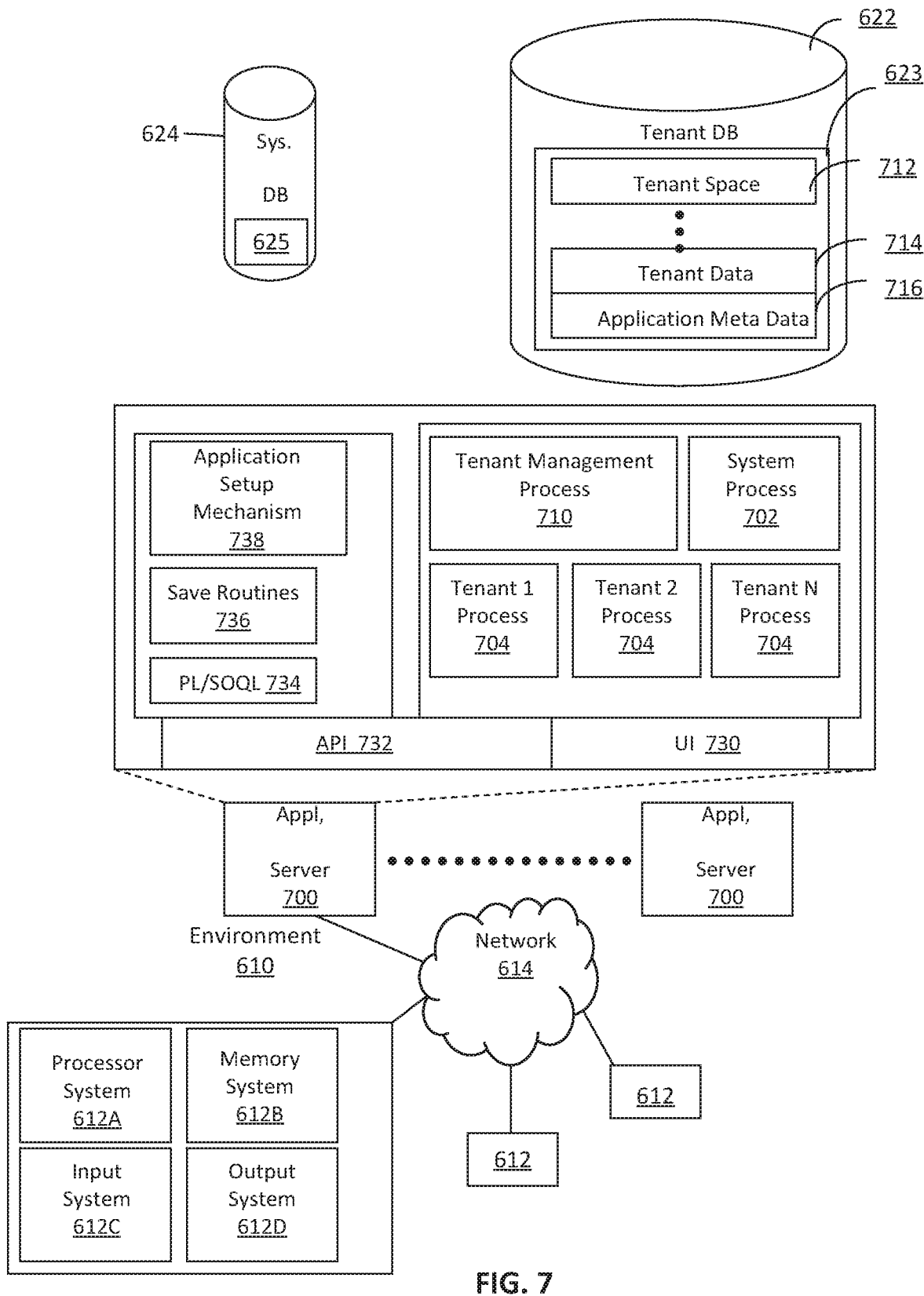
FIG. 7 illustrates a block diagram of an embodiment of elements of FIG. 6 and various possible interconnections between these elements.

FIG. 7 also illustrates the environment 610. However, in FIG. 7 elements of the system 616 and various interconnections in an embodiment are further illustrated. FIG. 7 shows that the each of the user systems 612 may include a processor system 612A, a memory system 612B, an input system 612C, and an output system 612D. FIG. 7 shows the network 614 and the system 616. FIG. 7 also shows that the system 616 may include the tenant data storage 622, the tenant data 623, the system data storage 624, the system data 625, a User Interface (UI) 730, an Application Program Interface (API) 732, a PL/SOQL 734, save routines 736, an application setup mechanism 738, applications servers 7001-700N, a system process space 702, tenant process spaces 704, a tenant management process space 710, a tenant storage area 712, a user storage 714, and application metadata 716. In other embodiments, the environment 610 may not have the same elements as those listed above and/or may have other elements instead of, or in addition to, those listed above.

The user systems 612, the network 614, the system 616, the tenant data storage 622, and the system data storage 624 were discussed above in FIG. 6. Regarding the user systems 612, the processor system 612A may be any combination of one or more processors. The memory system 612B may be any combination of one or more memory devices, short term, and/or long term memory. The input system 612C may be any combination of input devices, such as one or more keyboards, mice, trackballs, scanners, cameras, and/or interfaces to networks. The output system 612D may be any combination of output devices, such as one or more monitors, printers, and/or interfaces to networks. As shown by FIG. 7, the system 616 may include the network interface 620 (of FIG. 6) implemented as a set of HTTP application servers 700, the application platform 618, the tenant data storage 622, and the system data storage 624. Also shown is the system process space 702, including individual tenant process spaces 704 and the tenant management process space 710. Each application server 700 may be configured to access tenant data storage 622 and the tenant data 623 therein, and the system data storage 624 and the system data 625 therein to serve requests of the user systems 612. The tenant data 623 might be divided into individual tenant storage areas 712, which may be either a physical arrangement and/or a logical arrangement of data. Within each tenant storage area 712, the user storage 714 and the application metadata 716 might be similarly allocated for each user. For example, a copy of a user's most recently used (MRU) items might be stored to the user storage 714. Similarly, a copy of MRU items for an entire organization that is a tenant might be stored to the tenant storage area 712. The UI 730 provides a user interface and the API 732 provides an application programmer interface to the system 616 resident processes to users and/or developers at the user systems 612. The tenant data and the system data may be stored in various databases, such as one or more Oracle™ databases.

The application platform 618 includes the application setup mechanism 738 that supports application developers' creation and management of applications, which may be saved as metadata into the tenant data storage 622 by the save routines 736 for execution by subscribers as one or more tenant process spaces 704 managed by the tenant management process 710 for example. Invocations to such applications may be coded using the PL/SOQL 734 that provides a programming language style interface extension to the API 732. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 716 for the subscriber making the invocation and executing the metadata as an application in a virtual machine.

Each application server 700 may be communicably coupled to database systems, e.g., having access to the system data 625 and the tenant data 623, via a different network connection. For example, one application server 7001 might be coupled via the network 614 (e.g., the Internet), another application server 700N-1 might be coupled via a direct network link, and another application server 700N might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer®) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also may be used. For example, in certain embodiments, three consecutive requests from the same user could hit three different application servers 700, and three requests from different users could hit the same application server 700. In this manner, the system 616 is multi-tenant, wherein the system 616 handles storage of, and access to, different objects, data and applications across disparate users and organizations.

As an example of storage, one tenant might be a company that employs a sales force where each salesperson uses the system 616 to manage their sales process. Thus, a user might maintain contact data, leads data, customer follow-up data, performance data, goals and progress data, etc., all applicable to that user's personal sales process (e.g., in the tenant data storage 622). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 616 might also maintain system level data usable by multiple tenants or other data. Such system level data might include industry reports, news, postings, and the like that are sharable among tenants.

In certain embodiments, the user systems 612 (which may be client systems) communicate with the application servers 700 to request and update system-level and tenant-level data from the system 616 that may require sending one or more queries to the tenant data storage 622 and/or the system data storage 624. The system 616 (e.g., an application server 700 in the system 616) automatically generates one or more SQL statements (e.g., one or more SQL queries) that are designed to access the desired information. The system data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
   one or more processors; and
   a non-transitory computer readable medium storing a plurality of instructions, which when executed, will cause the one or more processors to perform operations comprising:
   receiving metadata associated with data stored as part of a distributed storage platform, the data stored within topics including partitions distributed amongst brokers, the partitions including leader partitions handling read and write requests, each of the leader partitions associated with one or more replica partitions that passively replicate the associated leader;
   determining an initial distribution mapping of the partitions amongst the brokers from the metadata;
   determining the initial distribution mapping of the partitions satisfies one or more criteria impacting a performance of the distributed storage platform;
   creating, from the initial distribution mapping, a redistribution mapping of the partitions amongst the brokers, including:
   a) reassigning a first set of the partitions to different brokers such that replica partitions associated with a same leader partition are not stored on a same fault domain; and
   b) reassigning a second set of the partitions to different brokers such that each broker has a substantially equal number of partitions of a particular topic;
   initiating a redistribution of the partitions amongst the brokers by reassigning the partitions from the initial distribution mapping to the created redistribution mapping.

2. The system of claim 1, wherein creating the redistribution mapping of the partitions amongst the brokers, further includes:
   c) reassigning a third set of the partitions to different brokers such that each broker has a substantially equal number of total partitions.

3. The system of claim 2, wherein creating the redistribution mapping of the partitions amongst the brokers, further includes:
   d) reassigning a fourth set of the partitions to different brokers such that each broker has a substantially equal number of leader partitions.

4. The system of claim 3, wherein creating the redistribution mapping includes performing the reassigning in an ordered sequence from steps a) to d).

5. The system of claim 1, wherein the distributed storage platform is implemented as part of a Kafka® platform, and the metadata is received from a Zookeeper® service provided the Kafka® platform.

6. The system of claim 5, wherein initiating the redistribution of the partitions includes causing the Zookeeper® service to execute the redistribution mapping.

7. The system of claim 1, wherein the fault domain includes a particular broker.

8. A method comprising:
   receiving, by a database system, metadata associated with data stored as part of a distributed storage platform, the data stored within topics including partitions distributed amongst brokers, the partitions including leader partitions handling read and write requests, each of the leader partitions associated with one or more replica partitions that passively replicate the associated leader;
   determining, by the database system, an initial distribution mapping of the partitions amongst the brokers from the metadata;
   determining, by the database system, the initial distribution mapping of the partitions satisfies one or more criteria impacting a performance of the distributed storage platform;
   creating, by the database system, from the initial distribution mapping, a redistribution mapping of the partitions amongst the brokers, including:
   a) reassigning a first set of the partitions to different brokers such that replica partitions associated with a same leader partition are not stored on a same fault domain; and
   b) reassigning a second set of the partitions to different brokers such that each broker has a substantially equal number of partitions of a particular topic;
   initiating, by the database system, a redistribution of the partitions amongst the brokers by reassigning the partitions from the initial distribution mapping to the created redistribution mapping.

9. The method of claim 8, wherein creating the redistribution mapping of the partitions amongst the brokers, further includes:

c) reassigning a third set of the partitions to different brokers such that each broker has a substantially equal number of total partitions.

10. The method of claim 9, wherein creating the redistribution mapping of the partitions amongst the brokers, further includes:
d) reassigning a fourth set of the partitions to different brokers such that each broker has a substantially equal number of leader partitions.

11. The method of claim 10, wherein creating the redistribution mapping includes performing the reassigning in an ordered sequence from steps a) to d).

12. The method of claim 8, wherein the distributed storage platform is implemented as part of a Kafka® platform, and the metadata is received from a Zookeeper® service provided the Kafka® platform.

13. The method of claim 12, wherein initiating the redistribution of the partitions includes causing the Zookeeper® service to execute the redistribution mapping.

14. The method of claim 8, wherein the fault domain includes a particular broker.

15. A computer program product comprising computer-readable program code capable of being executed by one or more processors when retrieved from a non-transitory computer-readable medium, the program code including instructions to:
receive metadata associated with data stored as part of a distributed storage platform, the data stored within topics including partitions distributed amongst brokers, the partitions including leader partitions handling read and write requests, each of the leader partitions associated with one or more replica partitions that passively replicate the associated leader;
determine an initial distribution mapping of the partitions amongst the brokers from the metadata;
determine the initial distribution mapping of the partitions satisfies one or more criteria impacting a performance of the distributed storage platform;
create, from the initial distribution mapping, a redistribution mapping of the partitions amongst the brokers, including:

a) reassigning a first set of the partitions to different brokers such that replica partitions associated with a same leader partition are not stored on a same fault domain; and
b) reassigning a second set of the partitions to different brokers such that each broker has a substantially equal number of partitions of a particular topic;
initiate a redistribution of the partitions amongst the brokers by reassigning the partitions from the initial distribution mapping to the created redistribution mapping.

16. The computer program product of claim 15, wherein the instructions to create the redistribution mapping of the partitions amongst the brokers, further includes instructions to:
c) reassign a third set of the partitions to different brokers such that each broker has a substantially equal number of total partitions.

17. The computer program product of claim 16, wherein the instructions to create the redistribution mapping of the partitions amongst the brokers, further includes instructions to:
d) reassign a fourth set of the partitions to different brokers such that each broker has a substantially equal number of leader partitions.

18. The computer program product of claim 17, wherein the instructions to create the redistribution mapping includes further instructions to perform the reassigning in an ordered sequence from steps a) to d).

19. The computer program product of claim 15, wherein the distributed storage platform is implemented as part of a Kafka® platform, and the metadata is received from a Zookeeper® service provided the Kafka® platform.

20. The computer program product of claim 19, wherein the instructions to initiate the redistribution of the partitions includes further instructions to cause the Zookeeper® service to execute the redistribution mapping.

* * * * *